United States Patent
Stoychev

(10) Patent No.: US 11,428,258 B2
(45) Date of Patent: Aug. 30, 2022

(54) STEER AXLE ASSEMBLY

(71) Applicant: Dana Heavy Vehicle Systems Group, LLC, Maumee, OH (US)

(72) Inventor: Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/844,266

(22) Filed: Apr. 9, 2020

(65) Prior Publication Data
US 2021/0317860 A1 Oct. 14, 2021

(51) Int. Cl.
*F16B 29/00* (2006.01)
*B62D 15/02* (2006.01)
*B62D 7/18* (2006.01)

(52) U.S. Cl.
CPC ............ *F16B 29/00* (2013.01); *B62D 7/18* (2013.01); *B62D 15/0205* (2013.01)

(58) Field of Classification Search
CPC ........ F16B 29/00; F16B 39/284; F16B 39/02; B62D 7/18; B62D 15/0205; B62D 5/061; B62D 5/0469; B60G 2204/45
See application file for complete search history.

(56) References Cited

U.S. PATENT DOCUMENTS

| 3,007,364 | A | * | 11/1961 | Dickie | F16B 29/00 411/15 |
| 4,474,515 | A | * | 10/1984 | Pitzer | F16B 29/00 411/16 |
| 4,907,929 | A | | 3/1990 | Johnston, Jr. | |
| 5,052,528 | A | * | 10/1991 | Sullivan | F16F 9/48 188/317 |
| 5,082,409 | A | | 1/1992 | Bias | |
| 5,683,215 | A | * | 11/1997 | Gaignard | F16F 1/3732 411/34 |
| 9,598,104 | B1 | | 3/2017 | Lam | |
| 2003/0077142 | A1 | * | 4/2003 | Stone | F16B 5/0233 411/107 |
| 2006/0082094 | A1 | * | 4/2006 | Mosier | B60G 21/051 280/124.116 |
| 2007/0243035 | A1 | * | 10/2007 | Pratt | F16B 31/021 411/15 |
| 2012/0311947 | A1 | * | 12/2012 | Van Wissen | F16B 13/066 52/250 |
| 2015/0258672 | A1 | | 9/2015 | Langdon, Jr. | |

(Continued)

FOREIGN PATENT DOCUMENTS

| CN | 20740610 | | 10/2017 | | |
| DE | 817229 | C * | 10/1951 | ............ | B21J 15/045 |

(Continued)

*Primary Examiner* — Paul N Dickson
*Assistant Examiner* — Kurtis Nielson
(74) *Attorney, Agent, or Firm* — Marshall & Melhorn, LLC

(57) ABSTRACT

A steering stop mechanism including a fastener, a retention element disposed about the fastener, an adapter configured to receive at least a portion of the fastener therein, and a retention sleeve disposed about at least a portion of the fastener, the retention element, and the adapter. The retention sleeve is deformable and produced from a malleable material to allow the retention sleeve to conform to a shape of the retention element and the adapter during assembly of the steering stop mechanism with a working component.

20 Claims, 3 Drawing Sheets

(56) References Cited

U.S. PATENT DOCUMENTS

| | | | | |
|---|---|---|---|---|
| 2016/0053794 A1* | 2/2016 | Anasis | ................... | F16B 37/14 |
| | | | | 411/60.1 |
| 2016/0238059 A1 | 8/2016 | Groppo | | |
| 2018/0126782 A1* | 5/2018 | Sinka | ................. | B60B 27/0073 |
| 2020/0116188 A1* | 4/2020 | Wang | ................... | F16B 25/106 |

FOREIGN PATENT DOCUMENTS

| | | | | |
|---|---|---|---|---|
| DE | 3740061 A1 * | 6/1989 | ........... | F16D 1/0805 |
| DE | 19517620 A1 * | 11/1995 | ........... | F16F 1/3732 |
| EP | 0161916 A2 * | 11/1985 | ........... | F16B 13/061 |
| FR | 1508396 A * | 1/1968 | ............. | F16B 29/00 |
| GB | 542167 A * | 12/1941 | ............. | F16B 29/00 |
| GB | 740663 A * | 11/1955 | ............ | F16B 13/061 |

* cited by examiner

STEER AXLE ASSEMBLY

FIELD

The subject matter of the embodiments described herein relates generally to a steer axle assembly and, more particularly, to a turn angle limiting device for a steer axle assembly.

BACKGROUND

Vehicles generally include a mechanism that limits a steer angle of steerable wheels to prevent contact between a rotatable wheel and other structural elements of the vehicle. This steering stop mechanism generally comprises of mating elements on a vehicle axle and steering knuckle assembly that contact each other at a certain maximum steering angle and thereby limit further pivoting movement of a steering knuckle relative to the vehicle axle.

The greater the steering angle, the tighter the radius of turn that is achievable. Generally, to increase maneuverability, a greater steering angle is preferable. In many vehicles the stop mechanism is selectively set to limit steering angle to a predetermined maximum limit. Often however, individual vehicles of the same type will be provided with wheels and tires selected from a wide variety of heights and widths. An oversized wheel generally necessitates decreasing the maximum steering angle whereas a smaller wheel may permit increasing the steering angle. The use derived from a given vehicle may also influence the maximum desirable steer angle. Therefore, in various applications, it is preferable to provide a means of setting the steering stop mechanism, and thereby the maximum possible steering angle of an individual vehicle, which is easier to assemble and maintain a desired position thereof.

The conventional steering stop mechanisms suffer from unwanted and dangerous field failures due to an undesired movement (i.e. backing out) of a fastener relative to the steering knuckle assembly. It would be desirable to produce a steering stop mechanism which is easier to assemble and does not suffer from the field failures inherent in conventional designs.

SUMMARY

In concordance and agreement with the present disclosure, a steering stop mechanism which is easier to assemble and does not suffer from the field failures inherent in conventional designs, has surprisingly been discovered.

In one embodiment, a steering stop mechanism for a steer axle assembly, comprises: a fastener coupled to a steering knuckle assembly; a retention element disposed on a portion of the fastener; and a deformable retention sleeve disposed on a portion of the retention element to maintain a position of the fastener relative to the working component.

In another embodiment, a method for setting a predetermined perimeter of a steering axle assembly, comprises: providing a steering knuckle assembly; providing a steering stop mechanism including a fastener and a deformable retention sleeve; coupling the fastener with the steering knuckle assembly until the fastener is in a desired position; and causing the retention sleeve to engage at least a portion of the steering stop mechanism to militate against a movement of the fastener from the desired position.

As aspects of certain embodiments, the desired position of the fastener correlates to a desired maximum turn angle of the steering axle assembly.

As aspects of certain embodiments, the fastener is in threaded engagement with an adapter.

As aspects of certain embodiments, at least a portion of the retention sleeve is conformed to a shape of the retention element.

As aspects of certain embodiments, the retention sleeve is produced from a malleable material.

As aspects of certain embodiments, further comprising an adapter configured to receive at least a portion of the fastener therein.

As aspects of certain embodiments, the adapter is configured to be received by the steering knuckle assembly.

As aspects of certain embodiments, at least a portion of the retention sleeve is conformed to a shape of the adapter.

As aspects of certain embodiments, the adapter includes a center bore having at least one of a plurality of threads formed therein and a plurality of external threads formed thereon.

BRIEF DESCRIPTION OF THE DRAWINGS

The above, as well as other objects and advantages of the subject matter of the embodiments described herein, will become readily apparent to those skilled in the art from a reading of the following detailed description of the embodiments when considered in the light of the accompanying drawings in which.

DETAILED DESCRIPTION

Figure 1A:
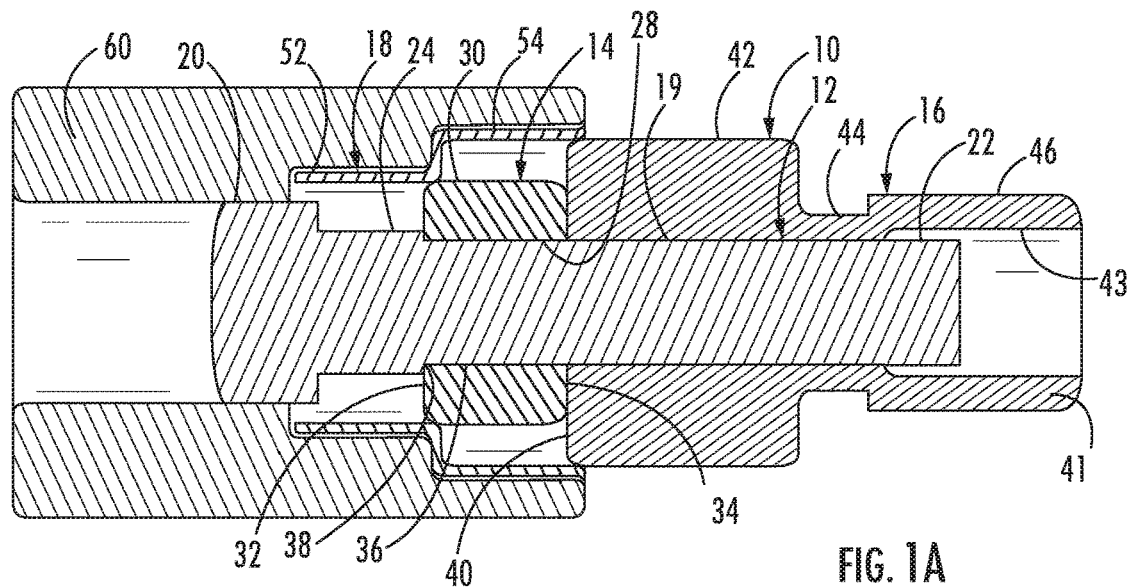
FIG. 1A is a cross-sectional view of an assembly mechanism employed with a stop mechanism including a fastener, a retention element, an adapter, and a retention sleeve according to an embodiment of the subject disclosure, showing the assembly mechanism and the retention sleeve in an initial or first position.

The following detailed description and appended drawings describe and illustrate various exemplary embodiments. The description and drawings serve to enable one skilled in the art to make and use the embodiments, and are not intended to limit the scope of the embodiments in any manner.

Referring now to the drawings wherein like reference numerals are used to identify identical components in the various, FIGS. 1A-2C illustrate a steering stop mechanism 10 for a steer axle assembly (not depicted) of a vehicle (not depicted). As a non-limiting example, the steering stop mechanism 10 is configured for use with a steering knuckle assembly (not depicted) of the steer axle assembly. In certain embodiments, the steer axle assembly 10 may be configured for use with a commercial vehicle. It should be understood, however, that the presently described subject matter may be employed in any suitable application such as commercial, industrial, and agricultural applications, for example.

As illustrated, the steering stop mechanism 10 includes a fastener 12, a retention element 14, an adapter 16, and a retention sleeve 18. In certain embodiments, the fastener 12 is a stop bolt for the steering knuckle assembly. The fastener 12 includes an elongated shaft 19 having a first end 20 and an opposite second end 22. As a non-limiting example, the first end 20 has a generally rectangular cross-sectional shape and the second end 22 has a plurality of external threads formed thereon. As shown, the shaft 19 has a general circular cross-sectional shape. The first end 20 has a first diameter and the second end 22 has a second diameter less than the first diameter. An intermediate stepped portion 24 of the shaft 19 disposed between the ends 20, 22 and having a third diameter less than the first diameter and greater than the second diameter. It is understood, however, that the fastener 12 may have any shape and size as desired. Various materials such as a metal or a plastic may be used to produce the fastener 12 as desired.

Figure 2A:
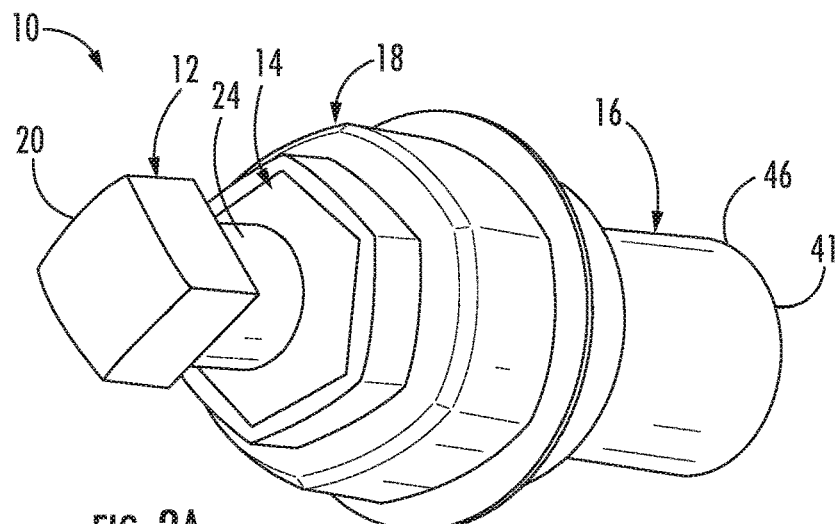
FIG. 2A is a side perspective view of the steering stop mechanism of FIGS. 1A-1C, showing the retention sleeve in the second position.
Figure 2B:
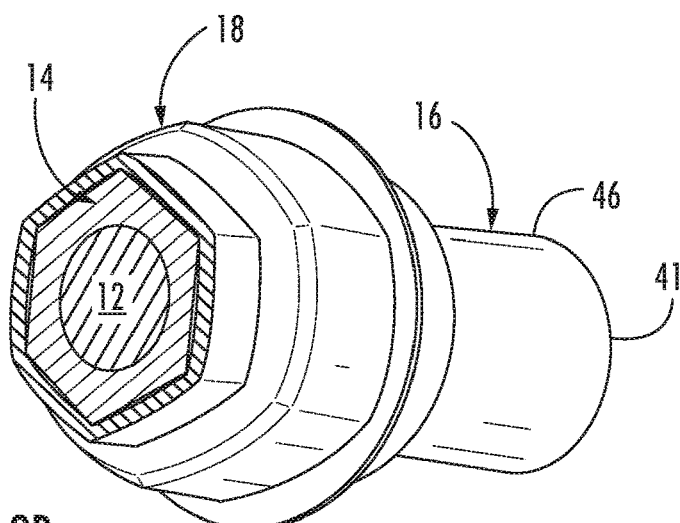
FIG. 2B is a side perspective view, partially in section, of the steering stop mechanism of FIGS. 1A-2A, showing a generally hexagonal shape of the retention element and the retention sleeve after assembly of the steering stop mechanism.

In certain embodiments, the intermediate portion 24 of the shaft 19 is configured to receive the retention element 14 therein. In a non-limiting example, the retention element 14 is a jam or lock nut for the stop bolt. As shown in FIGS. 2A and 2B, the retention element 14 has generally hexagonal-shaped cross-section. The retention element 14 includes a center bore having an inner circumferential surface 28. The retention element 14 also has an outer surface 30, a first axial surface 32, and an opposing axial surface 34. In certain embodiments, the inner circumferential surface 28 abuts an outer circumferential surface 36 of the intermediate portion 24, the first axial surface 32 abuts a shoulder 38 formed in the intermediate portion 24, and the second axial surface 34 abuts an axial surface 40 of the adapter 16.

Figure 2C:
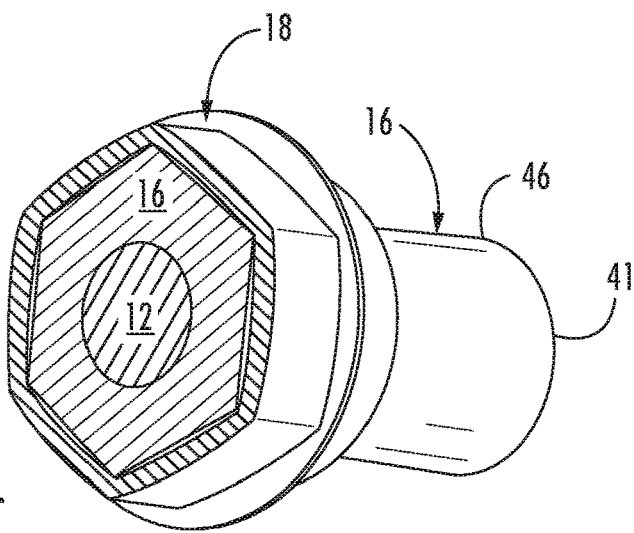
FIG. 2C is a side perspective view, partially in section, of the steering stop mechanism of FIGS. 1A-2B, showing a generally hexagonal shape of the adapter and the retention sleeve after assembly of the steering stop mechanism.

The adapter 16 includes a main body 41. As a non-limiting example, the main body 41 has a generally hexagonal-shaped cross-section as shown in FIG. 2C. The main body 41 has a central bore 43 formed therein. In certain embodiments, at least a portion of the central bore 43 of the adapter 16 has a plurality of internal threads formed therein. The internal threads of the adapter 16 are configured to receive and engage the external threads of the second end 22 of the fastener 12 to set a maximum turn angle of the steering axle assembly. The main body 41 may be formed by a first segment 42, a second segment 44, and a third segment 46, each having a first, second, and third diameters, respectively. In certain embodiments, the diameter of the first segment 42 is greater than both the diameters of the second and third segments 44, 46, the diameter of the second segment 44 is less than both the diameters of the first and third segments 42, 46, and the diameter of the third segment 46 is less than the diameter of the first segment 42 and greater than the diameter of the second segment 44. The adapter 16 may be configured to be at least partially received into a working component. As a non-limiting example, the working component is the steering knuckle assembly to provide an enhanced engagement with the fastener 12. In certain embodiments, at least one of the second and third segments 44, 46 are configured to be at least partially received into the steering knuckle assembly. As a non-limiting example, at least one of the first, second, and third segments 42, 44, 46 include a plurality of external threads formed thereon to be received and engaged by a plurality of internal threads formed in the steering knuckle assembly to provide an increased thread size and enhanced thread engagement on the fastener 12.

Figure 1B:
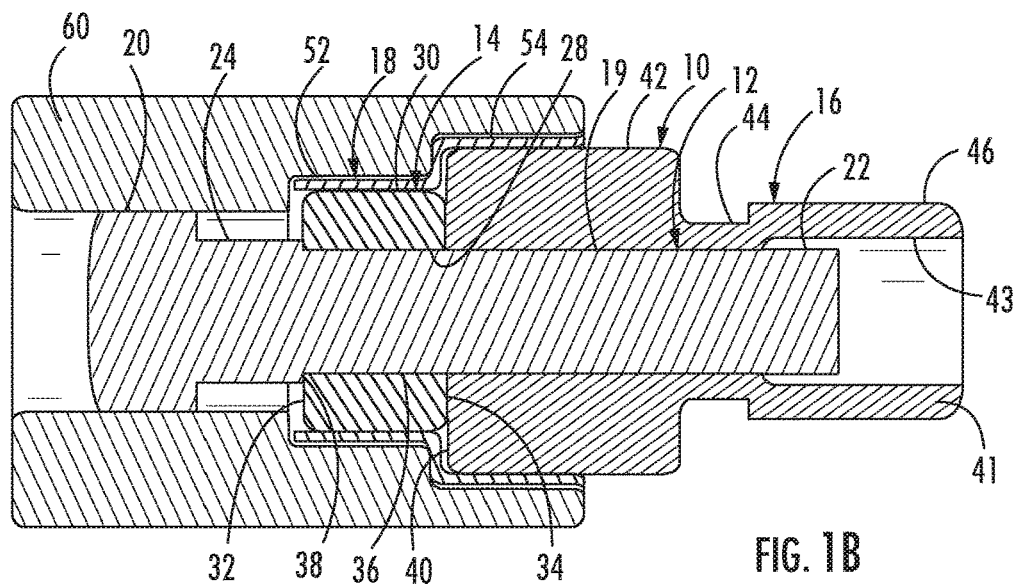
FIG. 1B is a cross-sectional view of the steering stop mechanism of FIG. 1A, showing the assembly mechanism and the retention sleeve in a final or second position.
Figure 1C:
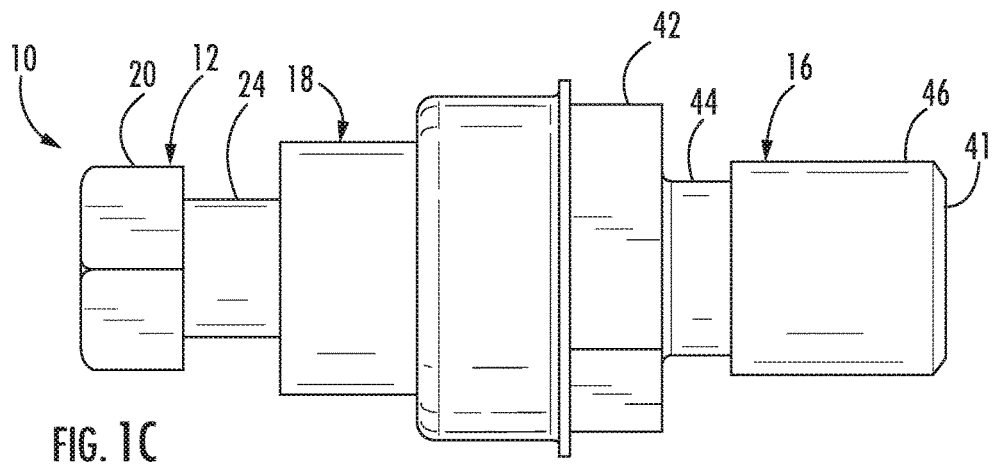
FIG. 1C is a side elevational view of the steering stop mechanism of FIGS. 1A-1B, showing the retention sleeve in the second position.
Figure 3:
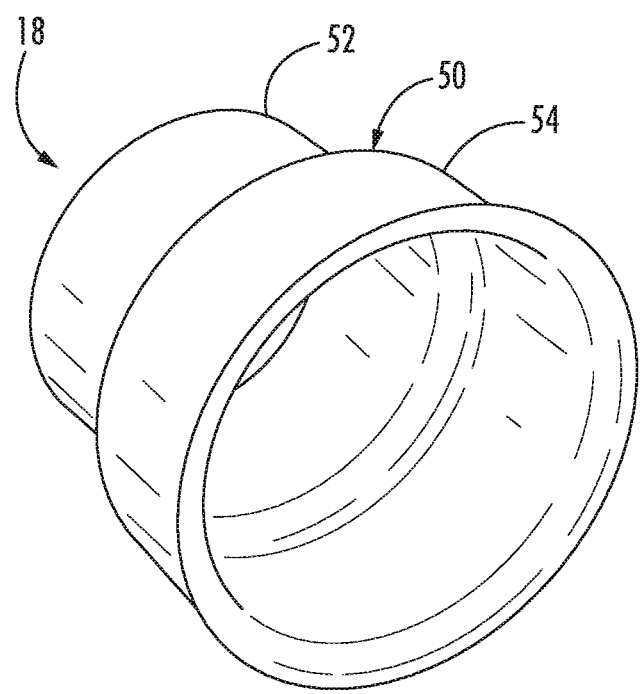
FIG. 3 is a side perspective view of the retention sleeve of the steering stop mechanism of FIGS. 1A-2C.
Figure 4:
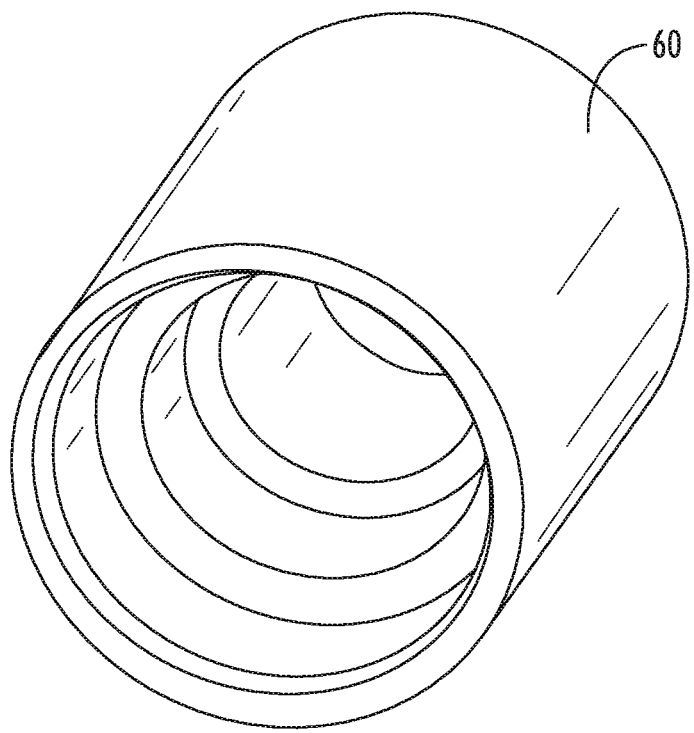
FIG. 4 is a side perspective view of the assembly mechanism of FIG. 1A-1B.

Referring now to FIGS. 1A, 1B, and 3, the retention sleeve 18 includes a deformable hollow main body 50. The main body 50 is produced from a malleable material such as a low-carbon steel, brass, and the like, for example. The main body 50 has a first portion 52 and a second portion 54. A diameter of the first portion 52 is less than a diameter of the second portion 54. In certain embodiments, prior to assembly, the diameter of the first portion 52 is smaller than an outer diameter of the retention element 14 and the diameter of the second portion 54 is smaller than an outer diameter of the first segment 42 of the adapter 16 to produce an interference fit therebetween when assembled. It should be appreciated, however, that the retention sleeve 18 can have any suitable shape, size, and configuration as desired.

Prior to assembly, when in an initial or first position shown in FIG. 1A, the retention sleeve 18 is disposed about at least a portion of the fastener 12 and at least a portion of the retention element 14. It should be appreciated that the retention sleeve 18 may be disposed about the at least a portion of the fastener 12 and the at least a portion of the retention element 14 by any suitable method such as by a press fit method, for example. After being assembled, when in a final or second position shown in FIGS. 1B and 1C, the retention sleeve 18 is disposed about at least a portion of the fastener 12, the retention element 14, and the adapter 16. The first end 20 of the fastener 12 and the retention sleeve 18 are configured to removably receive an assembly mechanism 60 thereon. A radial gap is formed between the retention sleeve 18 and the assembly mechanism 60. In certain embodiments, the assembly mechanism 60 is driven by an impact driver. It should be appreciated that the assembly mechanism 60 can be other various means of urging the fastener 12 and the retention sleeve 18 from the first position thereof, shown in FIG. 1A, to the second positions, shown in FIGS. 1B and 1C. A removal of the assembly mechanism 60 is facilitated by the radial gap formed between the assembly mechanism 60 and the retention sleeve 18.

To assemble the steering stop mechanism 10, the retention element 14 is disposed about the intermediate portion 24 of the fastener 12. Thereafter, the second end 22 of the fastener 12 is disposed into the adapter 16. In certain embodiment, the second end 22 of the fastener 12 is in threaded engagement at least one of the first, second, and third segments 42, 44, 46 of the adapter 16. The fastener 12 and the adapter 16 are disposed in the steering knuckle assembly until a desired position of the fastener 12 is reached which correlates to setting the maximum turn angle of the steering axle assembly. The retention sleeve 18 is then placed over the fastener 12 and the retention element 14 in the first position. The assembly mechanism 60 is then disposed on the first end 20 of the fastener 12 and the retention sleeve 18. Thereafter, the assembly mechanism 60 is activated causing the retention sleeve 18 to be urged from the first position to the second position. Because the retention sleeve 18 is deformable and produced from a malleable material, as the retention sleeve 18 is urged from the first position to the second position, the retention sleeve 18 moves over the retention element 14 which causes it to deform and conform into the cross-sectional shape of the retention element 14. As a non-limiting example, the retention sleeve 18 is deformed and conformed into a hexagonal shape of the retention element 14 as shown in FIGS. 2A and 2B. The deformed retention sleeve 18 militates against the retention element 14 from backing off and undesired movement of the fastener 12 relative to the steering knuckle assembly.

Advantageously, once the retention sleeve 18 is urged into the second position and conformed to the retention element 14, no secondary structure is needed to maintain a position of the retention sleeve 18. The retention sleeve 18 provides enhanced stop bolt preload retention over a use of a conventional split washer as well as a cleaner application and easiness in visual inspection of presence and proper installation of the retention sleeve 18 over a use of various thread locking compounds. Further, the retention sleeve 18 permits easier and safer application over a use of various bendable washers.

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

What is claimed is:

1. A steering stop mechanism for a steer axle assembly, comprising:
    a fastener coupled to a steering knuckle assembly;
    an adapter configured to receive at least a portion of the fastener therein;
    a retention element disposed on at least a portion of the fastener; and
    a deformable one-piece retention sleeve includes a main body having a first portion and a second portion, the first portion of the retention sleeve disposed on a portion of the retention element to maintain a position of the fastener relative to the steering knuckle assembly and the second portion disposed on a portion of the adapter.

2. The steering stop mechanism of claim 1, wherein the fastener is in threaded engagement with the adapter.

3. The steering stop mechanism of claim 1, wherein the first portion of the retention sleeve is conformed to a shape of the retention element.

4. The steering stop mechanism of claim 1, wherein an interference fit is formed between the retention sleeve and the retention element.

5. The steering stop mechanism of claim 1, wherein the position of the fastener correlates to a desired maximum turn angle of the steering axle assembly.

6. The steering stop mechanism of claim 1, wherein the retention sleeve is produced from a malleable material.

7. The steering stop mechanism of claim 1, wherein the adapter is configured to be received by the steering knuckle assembly.

8. The steering stop mechanism of claim 1, wherein the second portion of the retention sleeve is conformed to a shape of the adapter.

9. The steering stop mechanism of claim 1, wherein the adapter includes a center bore having at least one of a plurality of threads formed therein and a plurality of external threads formed thereon.

10. The steering stop mechanism of claim 1, wherein at least one of the first portion of the retention sleeve is conformed to a hexagonal shape of the retention element and the second portion of the retention sleeve is conformed to a hexagonal shape of the adapter.

11. The steering stop mechanism of claim 1, wherein the first portion of the retention sleeve has a first inner diameter and the second portion of the retention sleeve has a second inner diameter, and wherein the first inner diameter is smaller than the second inner diameter.

12. The steering stop mechanism of claim 11, wherein at least one of the inner diameter of the first portion of the retention sleeve is smaller than an outer diameter of the retention element to produce an interference fit therebetween when assembled and the inner diameter of the second portion of the retention sleeve is smaller than an outer diameter of the adapter to produce an interference fit therebetween when assembled.

13. A method for setting a predetermined parameter of a steer axle assembly, comprising:
    providing a steering knuckle assembly;
    providing a steering stop mechanism for the steer axle assembly comprising:
        a fastener coupled to the steering knuckle assembly;
        an adapter configured to receive at least a portion of the fastener therein;
        a retention element disposed on at least a portion of the fastener; and
        a deformable one-piece retention sleeve includes a main body having a first portion and a second portion, the first portion of the retention sleeve disposed on a portion of the retention element to maintain a position of the fastener relative to the steering knuckle assembly and the second portion disposed on a portion of the adapter;
    coupling the fastener with the steering knuckle assembly until the fastener is in a desired position; and
    causing the retention sleeve to engage at least a portion of the steering stop mechanism to militate against a movement of the fastener from the desired position.

14. The method of claim 13, wherein the desired position of the fastener correlates to a desired maximum turn angle of the steering axle assembly.

15. The method of claim 13, wherein the fastener is in threaded engagement with the adapter.

16. The method of claim 13, wherein the first portion of the retention sleeve is conformed to a shape of the retention element.

17. The method of claim 13, wherein the retention sleeve is produced from a malleable material.

18. The method of claim 13, wherein the adapter is configured to be received by the steering knuckle assembly.

19. The method of claim 13, wherein the second portion of the retention sleeve is conformed to a shape of the adapter.

20. The method of claim 13, wherein the adapter includes a center bore having at least one of a plurality of threads formed therein and a plurality of external threads formed thereon.

* * * * *